March 22, 1927.  
T. M. FINLEY  
1,621,977

FLEXIBLE POWER TRANSMISSION FOR INTERNAL COMBUSTION ENGINES

Filed May 21, 1926  2 Sheets-Sheet 1

Inventor  
T. M. Finley,  
By Harry F. Riley  
Attorney

March 22, 1927.  1,621,977
T. M. FINLEY
FLEXIBLE POWER TRANSMISSION FOR INTERNAL COMBUSTION ENGINES
Filed May 21, 1926   2 Sheets-Sheet 2

Inventor
T. M. Finley,
By Harry T. Riley
Attorney

Patented Mar. 22, 1927.

1,621,977

UNITED STATES PATENT OFFICE.

THOMAS M. FINLEY, OF ST. LOUIS, MISSOURI.

FLEXIBLE POWER TRANSMISSION FOR INTERNAL-COMBUSTION ENGINES.

Application filed May 21, 1926. Serial No. 110,734.

The invention relates to a flexible power transmission for internal combustion engines.

The object of the present invention is to provide for internal combustion engines of the type shown and described in Patent No. 1,572,522, granted to me February 9, 1926, and in Patent No. 1,572,523, granted to me and Allen Brown, February 9, 1926, a simple, practical and efficient flexible power transmission capable of connecting the crank shafts of a pair of parallel internal combustion engines with a power shaft adapted to dispense with a chain and spur gear transmission and capable of also enabling the two engines to function as a single unitary motor.

Another object of the invention is to simplify and cheapen the construction of power transmission devices and to neutralize the expansive thrusts of two parallel internal combustion engines by turning the crank shafts outward in opposite directions thereby neutralizing the explosive thrusts of the said engines and exerting the impulse thrust outward on both sides of the motor instead of on one side only as with the single in-line shaft motor having a single continuous crank shaft.

Another object of the invention is to give the proper gyroscopic action to the crank shafts and fly wheels by revolving the same in opposite directions, thereby producing in the motor smoothness of operation and a lower amount of vibration not heretofore possible under known arrangement.

A further object of the invention is to eliminate the disadvantage of unequal wear occurring in transmissions employing gearing and sprocket chains and to produce a perfect functioning of all parts of the motor and to cause both rows of cylinders in a motor of the aforesaid type to synchronize perfectly.

Another object of the invention is to provide a power transmission which will develop less frictional resistance than either the gear or chain transmissions and absorb less of the motor's power and contribute to a larger efficiency in fuel and oil consumption.

Another object of the invention is to afford a perfect distribution of the firing impulses by firing two cylinders simultaneously on either side of the power shaft and at opposite sides of the transmission thereby eliminating any side thrust and causing the expansive thrust to tend to steady the motor structure and produce smoothness of operation and durability of parts throughout the motor.

It is also an object of the invention to conserve space in the construction of the transmission and to provide a power transmission which will occupy much less space in the motor than a gear or chain transmission thereby providing a more compact motor and at the same time reducing the weight of the same and the cost of the construction thereof.

Another object of the invention is to provide a practically noiseless operation by eliminating the noise incident to chain and gear transmission.

A further object of the invention is to eliminate the variable changeableness common to both gear and chain transmission and the timing and other troubles incident thereto and thereby lessen the difficulty of timing and making correct adjustments easy and certain.

With these and other objects in view, the invention consists in the construction and novel combination and arrangement of parts hereinafter fully described, illustrated in the accompanying drawings and pointed out in the claims hereto appended, it being understood that various changes in the form, proportion, and minor details of construction within the scope of the claims may be resorted to without departing from the spirit or sacrificing any of the advantages of the invention.

In the drawings:—

Figure 1:
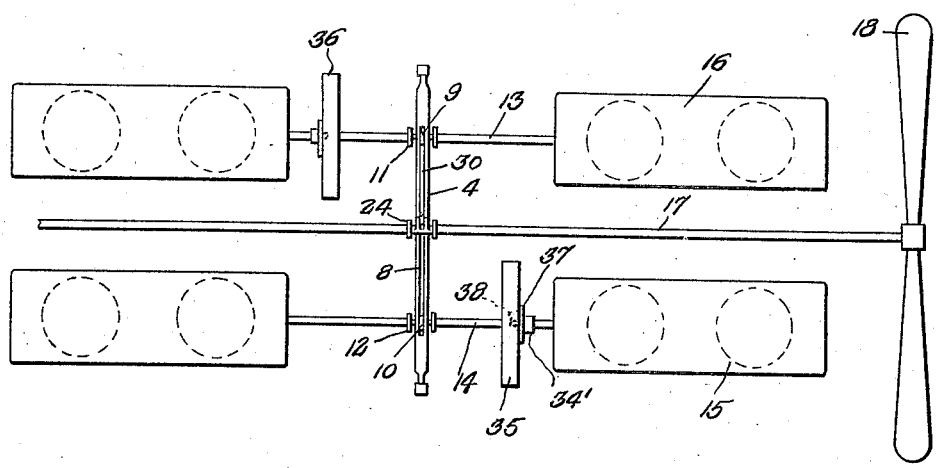
Figure 1 is a diagrammatic plan view of a motor provided with a flexible power transmission constructed in accordance with this invention.
Figure 2:
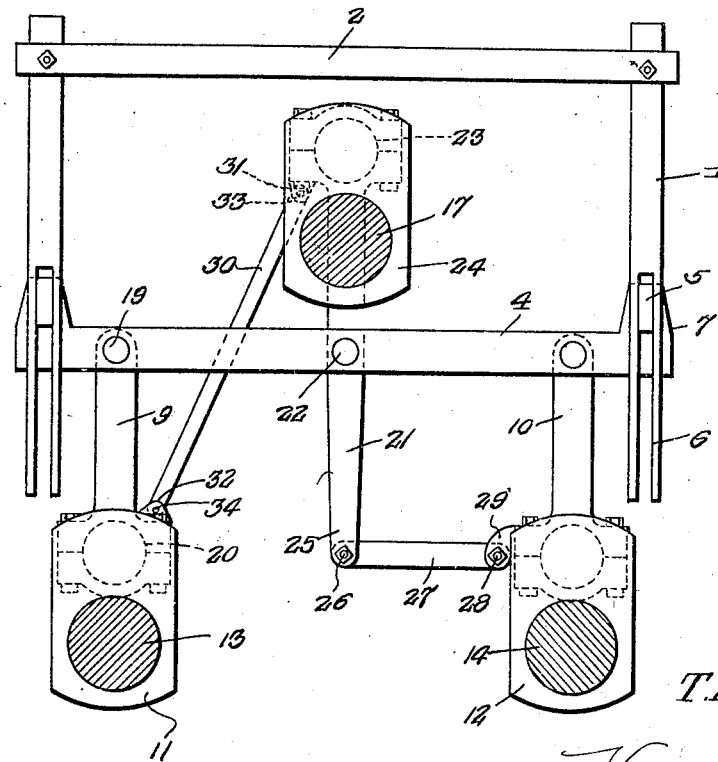
Fig. 2 is a transverse sectional view of the same the flexible power transmission being illustrated in elevation.

In the accompanying drawing in which is illustrated the preferred embodiment of the invention, the flexible power transmission comprises in its construction spaced vertical parallel guides 1 which are shown connected at their upper portions by a transverse bar 2 but the spaced vertical guides may be mounted and braced in any desired manner as will be readily understood. The vertical guides, which consist of bars are provided at their lower portions with vertical guide openings 3 forming ways for a vertically movable horizontally disposed cross head member 4 which has its ends arranged in the guide openings 3 of the vertical guides 1. The horizontal vertically movable cross head member is provided at its ends preferably at its upper face with laterally projecting lugs 5 which are arranged in guide slots 6 formed in the side walls of the guiding openings 3. The laterally projecting lugs are preferably braced by webs or flanges 7 and the slidable interlocking of the ends of the vertically movable cross head member with the vertical guides prevents any twisting of the said member and maintains the same in proper position in its vertical movement hereinafter explained. Any other suitable means may of course, be employed for slidably interlocking the ends of the horizontal vertically movable cross head member with the vertical guides or ways.

The cross head member is provided with a longitudinal slot or opening 8 terminating short of the ends of the cross head member and receiving at its terminals connecting bars 9 and 10 which extend downwardly from the cross head member 2 and are connected with cranks 11 and 12 of crank shafts 13 and 14 of a pair of parallel internal combustion engines 15 and 16. The flexible power transmission connects the crank shafts 13 and 14 with a propeller or power transmission shaft 17 arranged in parallelism with the crank shafts 13 and 14 and located centrally of the space between the spaced crank shafts 13 and 14 and above the same so that the engines will occupy a position substantially below the horizontal plane of the power transmission or propeller shaft 17 to adapt the motor particularly for aeroplane use as the arrangement of the engine below the power transmission shaft 17 on which the propeller 18 of the aeroplane not shown, is mounted, will not obstruct the view of the aviator and will afford a clear and unobstructed view which is impossible with motors or engines having a propeller or power shaft located below the cylinders. While the power transmission or propeller shaft 17 is illustrated in the accompanying drawings as located above the crank shafts 13 and 14 it may be arranged in any other relative position as the flexible power transmission will operate in any position the triangularly arranged shafts 13, 14 and 17 may be placed.

The connecting rods 9 and 10 are connected at their upper ends by pivots 19 to the vertically movable cross head member and they are connected at their lower ends with the cranks 11 and 12 by the wrist pins 20 thereof. The cranks 11 and 12 rotate in opposite directions as indicated by the arrows in Fig. 3 of the drawing, the left hand crank shaft 13 in the said figure rotating in a counter-clockwise direction and the right hand crank shaft 14 rotating in a clockwise direction in the said figure and causing the vertical movement of the horizontal cross head member. The lower ends of the connecting rods 9 and 10 are provided with sectional bearings of the ordinary construction for the reception of the pivot or wrist pin portion of the crank elements of the shafts 13 and 14 but they may be constructed in any desired manner as will be readily understood.

The power is transmitted from the crank shafts 13 and 14 to the power shaft 17 through the connecting rods 9 and 10, the cross head member 4 and a centrally connecting rod 21 pivoted intermediate of its ends to the cross head member 4 in the slot 8 thereof by a suitable pivot 22 and extending above and below the same and connected at its upper end to the pivot 33 of the crank 24 of the power transmission shaft 17 which rotates in a counter-clockwise direction in Fig. 3 of the drawing as indicated by the arrow in the said figure. The upper end of the centrally connecting rod 21 is provided with a sectional bearing to receive the pivot or wrist pin portion 23 of the crank 24 and the lower portion of the centrally connecting rod extends downwardly from the cross head member and is provided with a bifurcated lower end 25 which is pivoted by a pin 26 or other suitable fastening device to one end of a link 27 which is connected at its outer end to the crank 12 of the right hand crank shaft 14 in Fig. 3 of the drawing. The outer end of the link is connected with the crank 12 by a pivot 28 which is preferably mounted on and carried by the lower end of the connecting bar 10 but it may be pivotally connected with the crank 12 in any other desired manner as will be readily understood. The lower end of the connecting bar 10 is preferably provided with spaced projecting ears 29 to receive the outer end of the horizontal laterally extending link 27.

Figure 3:
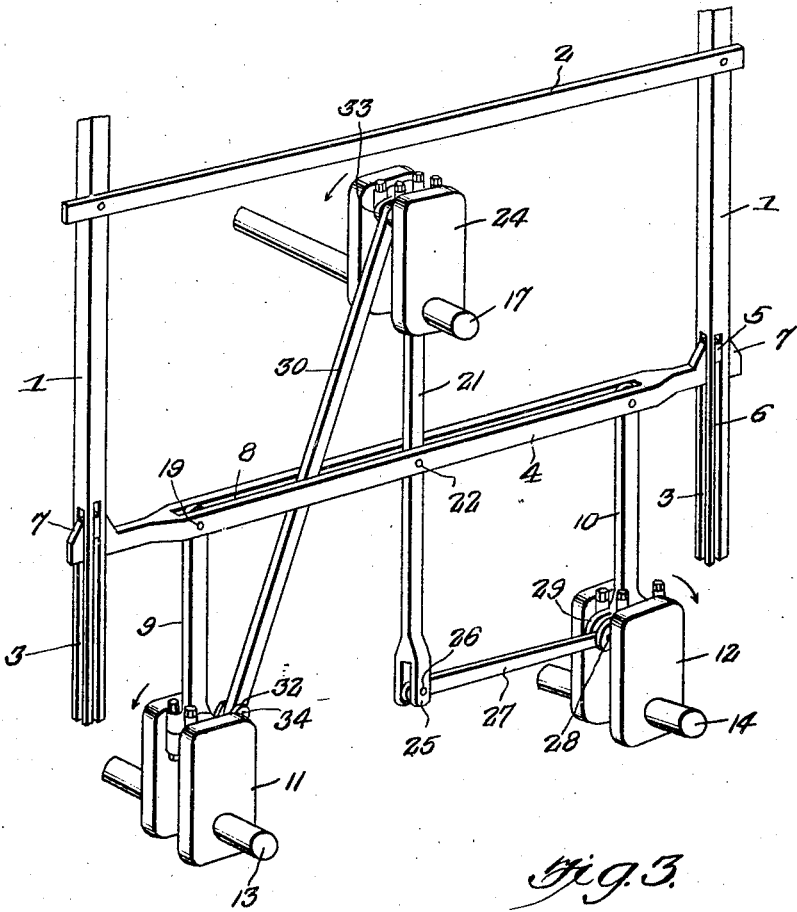
Fig. 3 is a perspective view of the power transmission.
Figure 4:
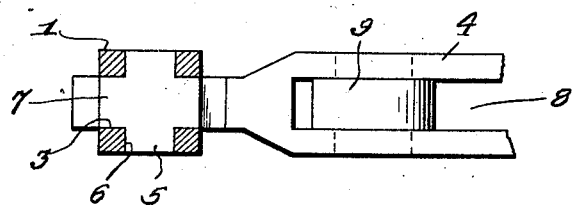
Fig. 4 is a detail horizontal sectional view through one of the vertical guides illustrating the arrangement of the vertically movable cross head member therein.

The crank 24 of the power transmission shaft is connected by an inclined auxiliary connecting rod 30 extending through the slot 8 of the vertically movable cross head member and pivotally connected at its upper end with the crank 24 and with the crank 11 of the left hand crank shaft 13 in Fig. 3. The upper end of the centrally connecting rod 21 is preferably provided with spaced flanges 31 and the lower end of the left hand connecting rod 9 is provided at its lower end with spaced flanges 32 and the upper and lower ends of the inclined auxiliary connecting rod 30 are pivoted between the said flanges 31 and 32 by pivot bolts 33 and 34 or other suitable forms of pivots. The arrangement of the connecting rods and the link connection between the centrally connecting rod and the crank 12 of the crank shaft 14 will cause a proper rotation of the cranks 11 and 12 and the crank 24 and in practice a starter (not shown) may be applied to any one of the crank shafts for rotating the same in the proper direction and the rotation of said crank shaft will through the flexible power transmission cause the rotation of the other crank shafts in the proper direction to rotate the cranks 11 and 12 and the crank 24 in the direction indicated by the arrows in Fig. 3 of the drawing and it will be apparent that the arrangement of the flexible power transmission is such that it will be thoroughly lubricated by the splash system.

The parallel internal combustion engines 15 and 16 are provided with two sets or blocks of cylinders as diagrammatically indicated in Fig. 1 of the drawings and the sets or blocks of cylinders are arranged in advance and in rear of the flexible power transmission and each internal combustion engine is provided with a continuous crank shaft composed of two sections having joints 34 located at opposite sides of the power transmission and the said joints include fly wheels 35 and 36. The fly wheels 35 and 36 are at opposite sides of the power transmission in advance and in rear of the same as clearly indicated in Fig. 1 of the drawings. One of the sections of each crank shaft is provided with a fly wheel and the other section has an attaching flange 37 and a longitudinal projection 38 which pivots in a suitable recess in the hub portion of the fly wheel, but either of the sections may be provided with the projection, or any other suitable form of joint may be of course employed.

Any desired number of cylinders may be employed in the engines and in practice the firing order will be such that two cylinders will be fired simultaneously, one on either side of the power transmission shaft and at opposite sides of the flexible power transmission and equidistant therefrom. In the motor illustrated in the drawings each engine is provided with four cylinders and the end cylinder at the front end of one engine will be fired simultaneously with the end cylinder at the rear end of the opposite engine and the second cylinder of the first mentioned engine will be fired simultaneously with the next to the last cylinder of the opposite engine, and so on until all of the cylinders have been fired. This will cause a perfect distribution of the firing impulses which will neutralize each other and will eliminate any side thrusts and tend to hold the engine sections together and produce a smoothness of operation and durability of parts throughout the motor not possible with a motor or engine having a single continuous row of cylinders. The flexible power transmission is arranged for causing the rotation of the crank shafts downwardly and outwardly from the position shown in Fig. 3 of the drawings but the crank shafts may be arranged to rotate in the opposite direction if desired and so long as the crank shafts rotate in opposite directions and the proper gyroscopic action of the shafts will be obtained and the firing impulse will be neutralized so long as the cylinders at opposite sides of the motor and at opposite sides of the power transmission at equidistance therefrom, are fired, but the arrangement illustrated in Fig. 3 of the drawing is preferred and tends to bind or hold the motors together. The firing order of the cylinders of the two engines may of course be changed and especially in engines having a larger number of cylinders than those illustrated in the drawings.

While the crank elements of the crank shafts are shown consisting of integral crank loops or bends, any other form of crank element may of course be employed. The power shaft is shown extending across the power transmission from the rear side to the front of the motor which in the form of the invention illustrated in the drawings is adapted for aeroplane use, but power may be taken from the power shaft at any other desired point as will be readily understood. The flexible power transmission enables the opposite internal combustion engines to function perfectly as a single motor which is impossible with any other type of transmission owing to the unequal wear of the gears and the unequal stretching of chain links. While the flexible power transmission is arranged in the accompanying drawings for aeroplane use it may of course be disposed in any other desired position to adapt the motor to the character of work to be performed.

What is claimed is:

1. In a gearless flexible power transmission, the combination of a plurality of internal combustion engines, having spaced parallel crank shafts, a power transmission crank shaft extending longitudinally of the crank shafts in spaced relation with the same and located beyond the plane of the engine crank shafts, and mechanism including connecting rods for transmitting power from the engine crank shafts to the power transmission crank shaft, and means for producing a rotation of the engine crank shafts in opposite directions.

2. The combination with internal combustion engines having spaced parallel crank shafts provided with opposite crank elements, a power shaft extending longitudinally of the crank shafts in spaced relation with the same and located beyond the plane of the engine crank shafts and provided with a crank element and a gearless, flexible power transmission including connecting rods for transmitting motion from the engine crank shafts to the power transmission crank shaft and having means for causing the engine crank shafts to rotate in opposite directions.

3. In a power transmission, the combination of a pair of internal combustion engines having spaced parallel crank shafts provided with opposite crank elements, a power shaft extending longitudinally of the crank shafts and located above the plane of the same and equidistant from the said crank shafts and provided with a crank element and a gearless power transmission device connecting the crank elements of the said shafts and provided with means for producing rotation of the engine crank shafts in opposite directions.

4. In a power transmission, the combination of a pair of internal combustion engines having spaced parallel crank shafts provided with opposite crank elements, a power shaft extending longitudinally of the crank shafts and located above the plane of the same and equidistant from the said crank shafts and provided with a crank element and a gearless power transmission device connecting the crank elements of the said shafts and provided with means for producing rotation of the engine crank shafts in opposite directions, and fly wheels mounted on the engine crank shafts and located at opposite sides of the power transmission device to produce a neutralizing gyroscopic action on the crank shafts.

5. In a power transmission, the combination of internal combustion engines having spaced parallel crank shafts provided with opposite crank elements, a power shaft extending longitudinally of the crank shafts in spaced relation with the same and located beyond the plane of the said crank shafts and provided with a crank element, a cross head member guided between the engine crank shafts and the power shaft, side connecting rods connecting the crank shafts with the cross head member, a central connecting rod connecting the power transmission shaft with the cross head and means connected with the crank elements for causing a rotation of the engine crank shafts in opposite directions.

6. In a power transmission, the combination of internal combustion engines having spaced parallel crank shafts provided with opposite crank elements, a power shaft extending longitudinally of the crank shafts in spaced relation with the same and located beyond the plane of the said crank shafts and provided with a crank element, a cross head member guided in the space between the crank shafts and the power shaft, side connecting rods connecting the cranks of the engine shafts with the cross head member, a central connecting rod connecting the cross head member with the crank element of the power shaft, an inclined link or auxiliary connecting rod extending from the crank element of the power shaft to the crank element of one of the engine crank shafts, and a link or auxiliary connecting rod extending from the crank element of the other engine shaft to the central connecting rod.

7. In a power transmission, the combination of a pair of internal combustion engines having spaced parallel crank shafts provided with opposite crank elements, a power shaft extending longitudinally of the crank shafts in spaced relation with the same and located beyond the plane of the said crank shafts and provided with a crank element, a cross head member guided between the engine crank shafts and the power shaft, side connecting rods extending from the crank elements of the engine shafts to the cross head member and pivotally connected with the same, a central connecting rod pivotally connected with the crank element of the power shaft and with the cross head member at the center thereof and projecting beyond the same to a point between the crank elements of the engine shafts, a link connecting the said projecting portion of the center connecting rod with the crank element of one of the engine shafts, and an inclined link or connecting rod extending from the crank element of the other engine shaft to the crank element of the power shaft.

8. In a power transmission, the combination of a pair of internal combustion engines having spaced parallel crank shafts provided with opposite crank elements, a power shaft extending longitudinally of the crank shafts in spaced relation with the same and located beyond the plane of the said crank shafts and provided with a crank element, a cross head member operating between the power shaft and the engine shafts, side connecting rods connecting the cross head member with the crank elements of the engine shafts, a center connecting rod extending from the crank element of the power shaft to the cross head member and extending beyond the same to a point between the crank elements of the engine shafts, a horizontal link connecting the terminal of the extended portion of the center connecting rod with the crank element of one of the engine shafts, an inclined link or connecting rod extending from the crank element of the other engine shaft to the crank element of a power transmission shaft and spaced parallel guides having ways receiving and guiding the terminal portions of the cross head member.

9. In a power transmission, the combination of a pair of internal combustion engines having spaced parallel crank shafts provided with opposite crank elements, a power shaft extending longitudinally of the crank shafts in spaced relation with the same and located beyond the plane of the said crank shafts and provided with a crank element, a cross head member operating between the power shaft and the engine shafts, side connecting rods connecting the cross head member with the crank elements of the engine shafts, a center connecting rod extending from the crank element of the power shaft to the cross head member and extending beyond the same to a point between the crank elements of the engine shafts, a horizontal link connecting the terminal of the extended portion of the center connecting rod with the crank element of one of the engine shafts, an inclined link or connecting rod extending from the crank element of the other engine shaft to the crank element of a power transmission shaft, spaced parallel guides having longitudinal openings receiving and guiding the terminal portions of the cross head member, said guides being also provided in the walls of the guiding openings with longitudinal slots and lugs or projections carried by the cross head member and guided in the said slots.

10. In a power transmission, the combination of internal combustion engines having spaced parallel crank shafts provided with opposite crank elements, a power shaft extending longitudinally of the crank shafts and located above the plane of the same and provided with a crank element, spaced vertical guides located at opposite sides of the said shafts, a horizontal cross head member having its terminal portions operating in the said guides and located between the engine shafts and the power shaft, side connecting rods connecting the crank elements of the engine shaft with the cross head member, a central connecting rod connecting the crank element of the power transmission shaft with the cross head member and extending below the same, a link connecting the lower end of the central connecting rod with the crank element of one of the engine shafts, and an inclined link or auxiliary connecting rod connecting the crank element of the other engine shaft with the crank element of the power transmission shaft.

11. In a power transmission, the combination of internal combustion engines having spaced parallel crank shafts provided with opposite crank elements, a power shaft extending longitudinally of the crank shaft and located above the plane of the same and provided with a crank element, spaced vertical guides located at opposite sides of the said shafts, a horizontal cross head member operating in the guides and provided between its ends with a longitudinal slot, side connecting rods connecting the crank element of the engine shaft with the cross head member and pivoted in the terminal portions of the slot thereof, a central connecting rod pivoted intermediate of its ends in the slot of the cross head member and connecting the same with the crank element of the power transmission shaft, a horizontal link pivoted to the lower end of the central connecting rod and to the lower end of one of the side connecting rods and connecting the central connecting rod with one of the engine crank shafts, and an inclined link or auxiliary connecting rod extending through the slot of the cross head member and pivoted to the upper end of the central connecting rod and to the lower end of the other side connecting rod for connecting the other engine shaft with the power transmission shaft.

In testimony whereof I affix my signature.

THOMAS M. FINLEY.